United States Patent
Kochura et al.

(10) Patent No.: US 10,162,741 B2
(45) Date of Patent: Dec. 25, 2018

(54) AUTOMATICALLY CORRECTING GUI AUTOMATION USING MACHINE LEARNING

(71) Applicant: International Business Machines Corporation, Armonk, NY (US)

(72) Inventors: Nadiya Kochura, Bolton, MA (US); Vinodkumar Raghavan, Woburn, MA (US); Donald H. Randall, Jr., Austin, TX (US); Derek M. Reedy, Ayer, MA (US); Timothy B. Snow, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/414,133

(22) Filed: Jan. 24, 2017

(65) Prior Publication Data
US 2018/0210824 A1    Jul. 26, 2018

(51) Int. Cl.
G06F 9/44     (2018.01)
G06F 11/36    (2006.01)
G06N 99/00    (2010.01)

(52) U.S. Cl.
CPC ...... G06F 11/3696 (2013.01); G06F 11/3664 (2013.01); G06N 99/005 (2013.01)

(58) Field of Classification Search
CPC .......................... G06F 11/3664; G06N 99/005
(Continued)

(56) References Cited

U.S. PATENT DOCUMENTS 6,088,690 A  *  7/2000  Gounares ............... G06N 3/126
                                                   706/13
7,536,648 B1 *  5/2009  Zhao ................... G06F 11/3688
                                                   714/27
(Continued)

OTHER PUBLICATIONS

Design and Evaluation of a Self-Correcting Gesture Interface based on Error Potentials from EEG—Felix Putze, Christoph Amma, Tanja Schultz; Karlsruhe Institute of Technology Karlsruhe, Germany—Gesture Elicitation & Recognition, CHI 2015, Crossings, Seoul, Korea.*

(Continued)

*Primary Examiner* — Francisco J Aponte
(74) *Attorney, Agent, or Firm* — Stephen R. Tkacs; Stephen J. Walder, Jr.; Diana R. Gerhardt

(57) ABSTRACT

A mechanism is provided in a data processing system comprising at least one processor and at least one memory, the at least one memory comprising instructions executed by the at least one processor to cause the at least one processor to implement a user interface automation tool. The user interface automation tool executes a script to perform automation functions on user interface controls in a user interface of an application. Responsive to automation of a given user interface control failing, the user interface automation tool identifies a candidate user interface control that is the same as a user interface control expected in the script using a machine learning model. The user interface automation tool corrects the script to refer to the candidate user interface control to form a corrected script. The user interface automation tool performs a user interface function on the candidate user interface control according the corrected script.

20 Claims, 6 Drawing Sheets

(58) Field of Classification Search
USPC .......................................................... 717/124
See application file for complete search history.

(56) References Cited

U.S. PATENT DOCUMENTS

| | | | |
|---|---|---|---|
| 8,196,112 B1* | 6/2012 | Cansizlar | G06F 17/30905 717/116 |
| 8,214,805 B2* | 7/2012 | Stewart | G06F 11/3664 715/762 |
| 8,365,147 B2 | 1/2013 | Grechanik et al. | |
| 8,401,221 B2 | 3/2013 | Milov et al. | |
| 8,458,662 B2* | 6/2013 | Grechanik | G06F 11/368 715/762 |
| 8,527,950 B2* | 9/2013 | Berry | G06F 9/454 717/124 |
| 8,527,953 B2* | 9/2013 | Grechanik | G06Q 10/06 715/762 |
| 8,549,483 B1* | 10/2013 | Bridges, Sr. | G06F 11/3684 717/126 |
| 8,881,095 B1* | 11/2014 | Hunt, Jr. | G06F 11/3688 705/7.13 |
| 8,924,938 B2 | 12/2014 | Chang et al. | |
| 9,032,373 B1 | 5/2015 | Gupta et al. | |
| 9,053,435 B2 | 6/2015 | Krukow et al. | |
| 9,767,009 B2* | 9/2017 | Cobb, Jr. | G06F 11/3688 |
| 9,767,284 B2* | 9/2017 | Ghose | G06F 21/566 |
| 9,824,060 B2* | 11/2017 | Yacout | G06F 15/18 |
| 2009/0049427 A1* | 2/2009 | Zhao | G06F 9/454 717/127 |
| 2009/0217302 A1* | 8/2009 | Grechanik | G06F 8/70 719/320 |
| 2009/0265689 A1* | 10/2009 | Gooi | G06F 11/366 717/125 |
| 2010/0180259 A1* | 7/2010 | Lindley | G06F 11/3616 717/124 |
| 2011/0047488 A1 | 2/2011 | Butin et al. | |
| 2011/0307864 A1* | 12/2011 | Grechanik | G06F 11/3604 717/124 |
| 2012/0088219 A1* | 4/2012 | Briscoe | G06N 99/005 434/362 |
| 2012/0173998 A1* | 7/2012 | Chaturvedi | G06F 11/368 715/762 |
| 2013/0132001 A1* | 5/2013 | Yacout | G01D 3/10 702/35 |
| 2013/0152047 A1* | 6/2013 | Moorthi | G06F 11/368 717/124 |
| 2014/0195466 A1* | 7/2014 | Phillipps | G06Q 10/04 706/12 |
| 2014/0325480 A1* | 10/2014 | Bhagavatula | G06F 11/3688 717/124 |
| 2014/0331173 A1* | 11/2014 | Minekawa | G02B 21/365 715/803 |
| 2015/0082277 A1* | 3/2015 | Champlin-Scharff | G06F 9/454 717/120 |
| 2015/0082280 A1* | 3/2015 | Betak | G06F 11/3692 717/124 |
| 2015/0378696 A1* | 12/2015 | Boehm | G06F 8/45 717/149 |
| 2016/0110657 A1* | 4/2016 | Gibiansky | G06N 99/005 706/12 |
| 2016/0154960 A1* | 6/2016 | Sharma | G06F 21/56 726/25 |
| 2016/0179659 A1* | 6/2016 | Champlin-Scharff | G06F 17/271 717/126 |
| 2016/0260023 A1* | 9/2016 | Miserendino, Jr. | G06F 17/30 |
| 2016/0350208 A1* | 12/2016 | Pilot | G06F 11/3684 |
| 2017/0032279 A1* | 2/2017 | Miserendino | G06N 99/005 |
| 2017/0060368 A1* | 3/2017 | Kochura | G06F 9/451 |
| 2017/0228305 A1* | 8/2017 | Krishnan | G06F 11/3664 |

OTHER PUBLICATIONS

Software that meets its intent—Delft University of Technology; Huisman, Marieke; Bos, Herbert; Brinkkemper, Sjaak; van Deursen, Arie; Groote, Jan Friso; Lago, Patricia; van de Pol, Jaco; Visser, Eelco; 7th International Symposium, ISoLA 2016, Proceedings.*

"Use Rational Function Tester ScriptAssure technology to build test scripts that run when code changes", IBM Corporation, http://www.ibm.com/developerworks/rational/library/10/userationalfunctionaltesterscriptassuretechnologytobuildtestscriptsthatrunwhencodechanges/, developerWorks, Apr. 20, 2010, 6 pages.

Chang, Tsung-Hsiang et al., "GUI Testing Using Computer Vision", ACM, CHI 2010, Atlanta, Georgia, Apr. 10-15, 2010, 10 pages.

Gove, Robert et al, "Machine Learning and Event-Based Software Testing: Classifiers for Identifying Infeasible GUI Event Sequences", Elsevier, http://www.sciencedirect.com/science/article/pii/B9780123965356000041, Advances in Computers, Chapter 4, vol. 86, Jul. 20, 2012, (Abstract only) 3 pages.

Maheswari, B. U. et al., "Survey on Graphical User Interface and Machine Learning Based Testing Technique", Science Alert, http://scialert.net/fulltext/?doi=jai.2014.94.112, Review Article, Journal of Artificial Intelligence, vol. 7, Sep. 20, 2014, (Abstract only) 15 pages.

* cited by examiner

```
Property 1: name=visible; value=true
Property 2: name=foreground; value=java.awt.Color[r=0, g=0, b=0]
Property 3: name=ignoreRepaint; value=false
Property 4: name=minimumSizeSet; value=false
Property 5: name=focusTraversalKeysEnabled; value=true
Property 6: name=location; value=java.awt.Point[x=0, y=2]
Property 7: name=focusTraversable; value=true
Property 8: name=background; value=java.awt.Color[r=255, g=255, b=255]
Property 9: name=name; value=canvas0
Property 10: name=selected; value=false
Property 11: name=backgroundSet; value=false
Property 12: name=toolTipText; value=Bold
Property 13: name=maximumSizeSet; value=false
Property 14: name=lightweight; value=false
Property 15: name=font; value=com.rational.test.ft.value.FontInfo[name=Dialog, style=0, size=12]
Property 16: name=opaque; value=true
Property 17: name=mousePosition; value=java.awt.Point[x=14, y=13]
Property 18: name=alignmentY; value=0.5
Property 19: name=alignmentX; value=0.5
Property 20: name=preferredSizeSet; value=false
Property 21: name=doubleBuffered; value=false
Property 22: name=maximumSize; value=java.awt.Dimension[width=32767, height=32767]
Property 23: name=focusOwner; value=false
Property 24: name=cursorSet; value=false
Property 25: name=preferredSize; value=java.awt.Dimension[width=27, height=27]
Property 26: name=foregroundSet; value=false
Property 27: name=focus; value=false
Property 28: name=locationOnScreen; value=java.awt.Point[x=173, y=179]
Property 29: name=fontSet; value=false
Property 30: name=curImage; value=0
Property 31: name=size; value=java.awt.Dimension[width=27, height=27]
Property 32: name=enabled; value=true
Property 33: name=y; value=2
Property 34: name=x; value=0
Property 35: name=bounds; value=java.awt.Rectangle[x=0, y=2, width=27, height=27]
Property 36: name=minimumSize; value=java.awt.Dimension[width=27, height=27]
Property 37: name=valid; value=true
Property 38: name=width; value=27
Property 39: name=filtered; value=0
Property 40: name=showing; value=true
Property 41: name=displayable; value=true
Property 42: name=height; value=27
Property 43: name=focusable; value=true
Property 44: name=class; value=lotus.notes.apps.editorpanel.MultiImgButton
```

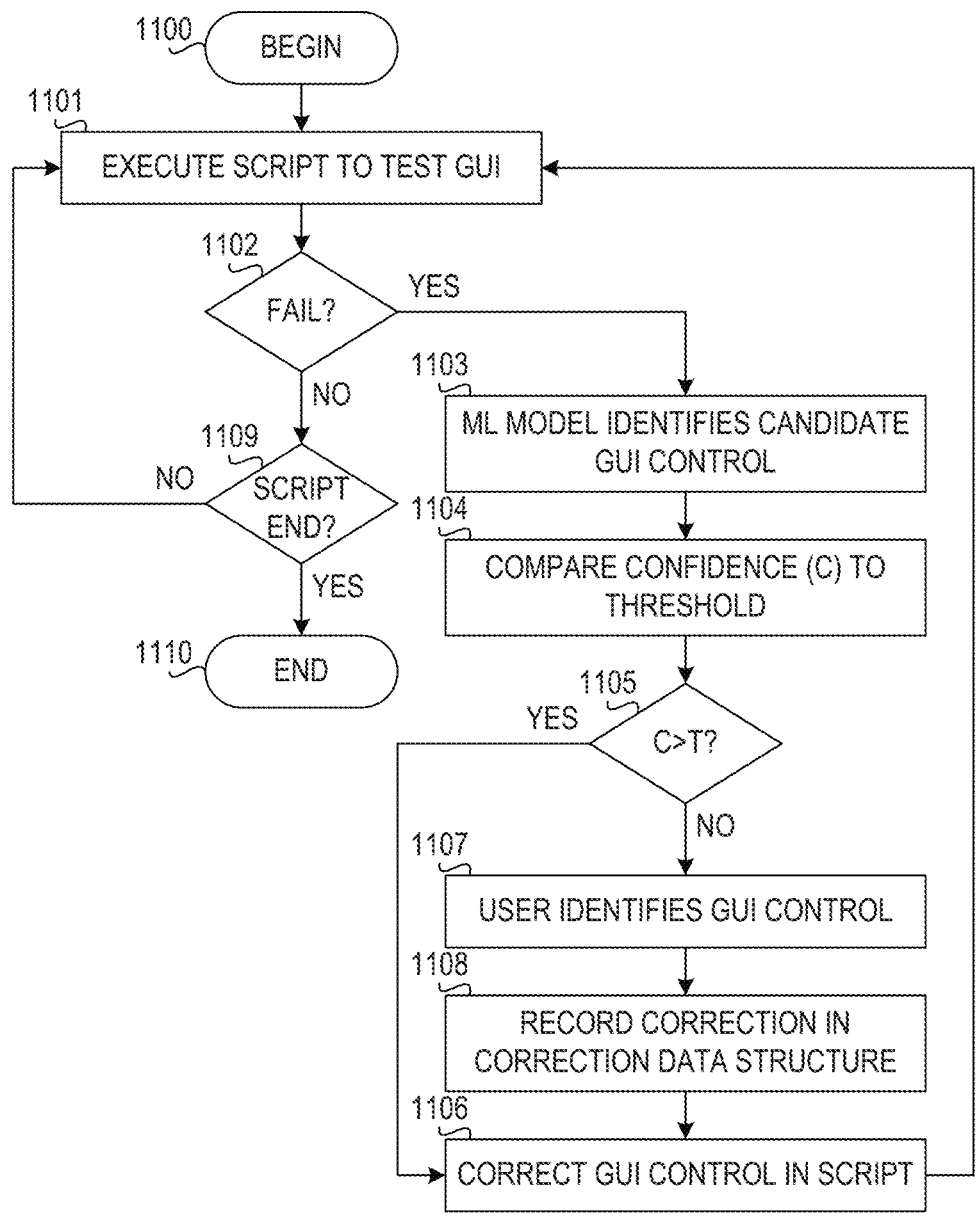

AUTOMATICALLY CORRECTING GUI AUTOMATION USING MACHINE LEARNING

BACKGROUND

The present application relates generally to an improved data processing apparatus and method and more specifically to mechanisms for automatically correcting graphical user interface automation using machine learning.

A graphical user interface (GUI) is a type of user interface that allows users to interact with electronic devices through graphical icons and visual indicators. The actions in a GUI are usually performed through direct manipulation of the graphical elements. GUIs are used in desktop applications, Web-based applications, and applications designed for handheld mobile devices.

In software testing, test automation is the use of special software separate from the software being tested to control the execution of tests and the comparison of actual outcomes with predicted outcomes. Test automation can automate some repetitive but necessary tasks in a formalized testing process already in place, or perform additional testing that would be difficult to do manually. Test automation is critical for continuous delivery and continuous testing.

Some software testing tasks, such as extensive low-level interface regression testing, can be laborious and time-consuming to do manually. In addition, a manual approach might not always be effective in finding certain classes of defects. Test automation offers a possibility to perform these types of testing effectively. Once automated tests have been developed, they can be run quickly and repeatedly. Many times, this can be a cost-effective method for regression testing of software products that have a long maintenance life. Even minor patches over the lifetime of the application can cause existing features to break which were working at an earlier point in time.

There are many approaches to test automation, however the general approaches used widely are as follows:

Graphical user interface (GUI) testing: a testing framework that generates user interface events such as keystrokes and mouse clicks, and observes the changes that result in the user interface, to validate that the observable behavior of the program is correct.

Application programming interface (API) driven testing: a testing framework that uses a programming interface to the application to validate the behavior under test.

Test automation tools can be expensive, and are usually employed in combination with manual testing. Test automation can be made cost-effective in the long term, especially when used repeatedly in regression testing. For example, a test case for common flow of an application can be a good candidate for test automation.

In automated testing the test engineer or software quality assurance person must have software coding ability, since the test cases are written in the form of source code which, when run, produce output according to the assertions that are a part of it. One way to generate test cases automatically is model-based testing through use of a model of the system for test case generation, but research continues into a variety of alternative methodologies for doing so. In some cases, the model-based approach enables non-technical users to create automated business test cases in plain English so that no programming of any kind is needed in order to configure them for multiple operating systems, browsers, and smart devices.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions executed by the at least one processor to cause the at least one processor to implement a user interface automation tool. The method comprises executing, by the user interface automation tool, a script to perform automation functions on user interface controls in a user interface of an application. The method further comprises, responsive to automation of a given user interface control failing, identifying, by the user interface automation tool, a candidate user interface control that is the same as a user interface control expected in the script using a machine learning model. The method further comprises correcting, by the user interface automation tool, the script to refer to the candidate user interface control to form a corrected script. The method further comprises performing, by the user interface automation tool, a user interface function on the candidate user interface control according the corrected script.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 depicts a listing of properties for one button of a graphical user interface in accordance with an illustrative embodiment;

FIG. 11 is a flowchart illustrating operation of a mechanism for automatically correcting GUI automation using machine learning in accordance with an illustrative embodiment.

DETAILED DESCRIPTION

Figure 1:
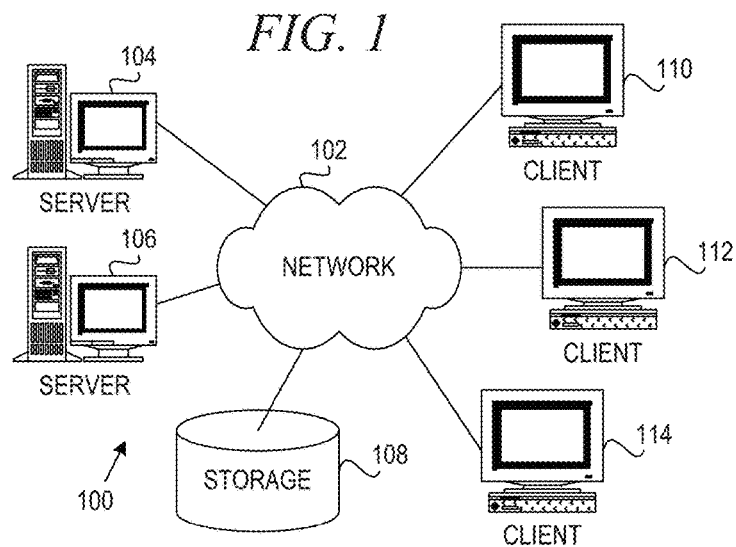
FIG. 1 is an example diagram of a distributed data processing system in which aspects of the illustrative embodiments may be implemented.

GUI automation navigates through applications via the GUI by clicking on buttons, checking checkboxes, typing text into text boxes, etc. in order to get the application in a state that is ready to test. To do this GUI automation tools must identify GUI controls on the screen in order to manipulate them. The way they do this currently is by identifying the controls by certain properties of the object. Graphical user interface (GUI) automation is notoriously fragile. Automation breaks frequently due to changes in the properties of GUI controls, sometimes from simply repositioning objects on the screen.

The illustrative embodiments provide mechanisms that apply machine learning to the problem of identifying GUI objects and determining which objects are the same objects through changes to their properties over time. The illustrative embodiments use machine learning techniques to train the tool to recognize an object as being the same object, changed only due to incidental changes to the properties. The mechanisms of the illustrative embodiments use corrections to the GUI automation as training data to train a machine learning model to recognize objects as being the same despite changes to the object properties.

Machine learning (ML) is the subfield of computer science that gives computers the ability to learn without being explicitly programmed. Evolved from the study of pattern recognition and computational learning theory in artificial intelligence, machine learning explores the study and construction of algorithms that can learn from and make predictions on data—such algorithms overcome following strictly static program instructions by making data driven predictions or decisions, through building a model from sample inputs. Machine learning is employed in a range of computing tasks where designing and programming explicit algorithms is unfeasible. Machine learning is closely related to, and often overlaps with, computational statistics, which also focuses on prediction-making through the use of computers.

Machine learning tasks are typically classified into three broad categories, depending on the nature of the learning "signal" or "feedback" available to a learning system. These are as follows:

Supervised learning: The computer is presented with example inputs and their desired outputs, given by a "teacher" or "trainer," and the goal is to learn a general rule that maps inputs to outputs.

Unsupervised learning: No labels are given to the learning algorithm, leaving it on its own to find structure in its input. Unsupervised learning can be a goal in itself (discovering hidden patterns in data) or a means towards an end (feature learning).

Reinforcement learning: A computer program interacts with a dynamic environment in which it must perform a certain goal (such as driving a vehicle), without a teacher explicitly telling it whether it has come close to its goal. Another example is learning to play a game by playing against an opponent.

Between supervised and unsupervised learning is semi-supervised learning, where the teacher gives an incomplete training signal: a training set with some, often many, of the target outputs missing. Transduction is a special case of this principle where the entire set of problem instances is known at learning time, except that parts of the targets are missing.

Another categorization of machine learning tasks arises when one considers the desired output of a machine-learned system:

In classification, inputs are divided into two or more classes, and the learner must produce a model that assigns unseen inputs to one or more (multi-label classification) of these classes. This is typically tackled in a supervised way. Spam filtering is an example of classification, where the inputs are email (or other) messages and the classes are "spam" and "not spam."

In regression, also a supervised problem, the outputs are continuous rather than discrete.

In clustering, a set of inputs is to be divided into groups. Unlike in classification, the groups are not known beforehand, making this typically an unsupervised task.

Density estimation finds the distribution of inputs in some space.

Dimensionality reduction simplifies inputs by mapping them into a lower-dimensional space. Topic modeling is a related problem, where a program is given a list of human language documents and is tasked to find out which documents cover similar topics.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
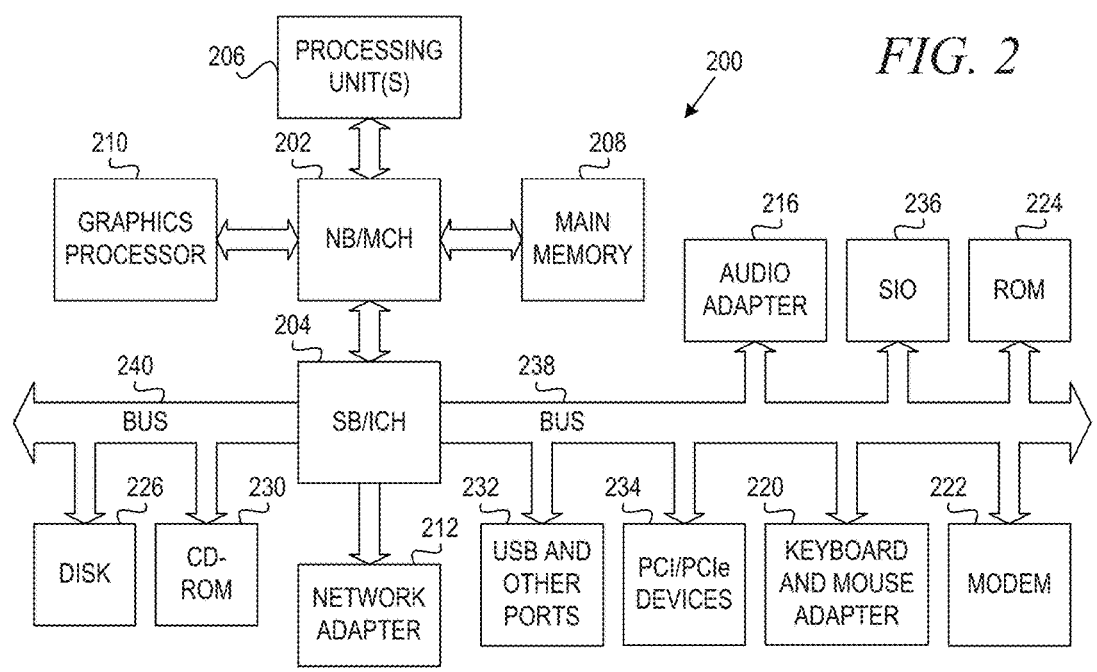
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for automatically correcting GUI automation using machine learning. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, and software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates training a machine learning model to be used within a GUI automation tool to recognize an object despite changes to object properties.

As noted above, the mechanisms of the illustrative embodiments utilize specifically configured computing devices, or data processing systems, to perform the operations for automatically correcting GUI automation using machine learning. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to automatically correcting GUI automation using machine learning.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
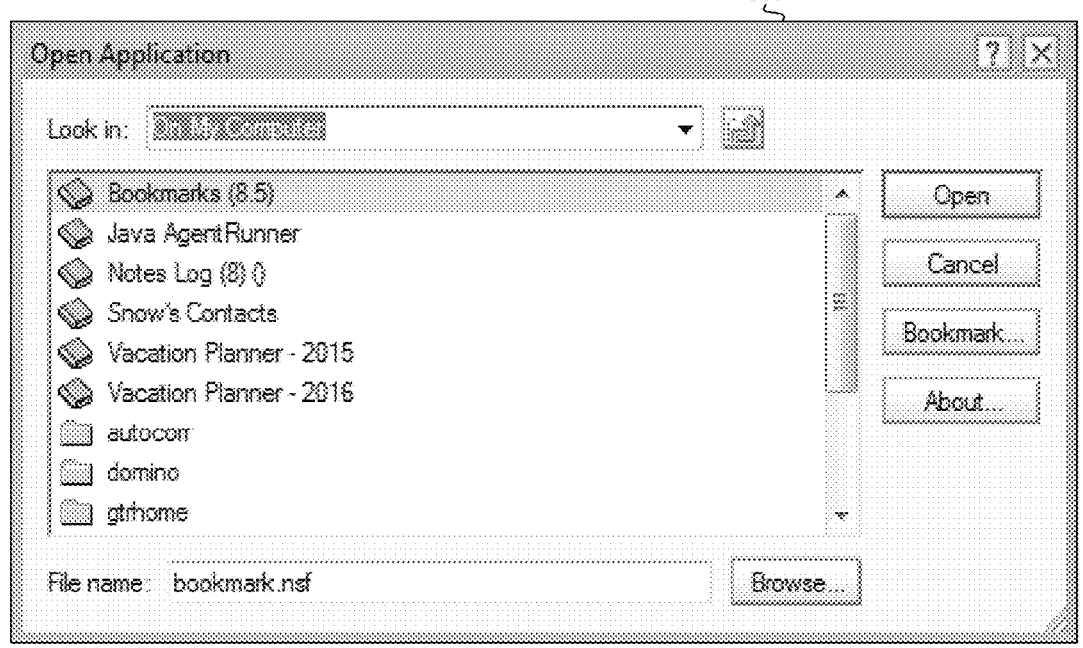
FIG. 3 depicts an example Open Application dialog in which aspects of the illustrative embodiments may be implemented.

GUI automation navigates through applications by clicking on buttons, checking checkboxes, typing text into text boxes, etc. in order to get the application in a state that is ready to test. To do this, GUI automation tools must identify GUI controls on the screen in order to manipulate them. Currently, GUI automation tools identify these controls by certain properties of the object. FIG. 3 depicts an example Open Application dialog in which aspects of the illustrative embodiments may be implemented. The buttons in Open Application dialog GUI can be identified by their class, their text, the order in which they appear, and their locations relative to the parent object, among other properties.

Some GUI automation tools, such as Silktest ask the programmer to identify a single property or combination of several of these properties, which it can use to identify the object. When those properties change, the automation will break giving a false negative result that the tester must fix manually by changing the properties to match the new state of the GUI.

Another tool called Rational Functional Tester (RFT) uses an innovation called "ScriptAssure" and uses all the properties of the object, but has thresholds attached to each of these properties that measure how much change the tool can tolerate before it fails and gives up on finding the object. This is an improvement, but still leads to frequent failures when the GUI changes, often even when the changes are unrelated to the GUI control being identified by the tool.

The illustrative embodiments solve this problem by using machine learning techniques to train the tool to recognize an object as being the same object with incremental changes to the properties. The illustrative embodiments use corrections to the GUI automation as training data to train the system to recognize objects as being the same over time.

In the example depicted in FIG. 3, the Open Application dialog 300, current GUI automation would use this dialog frequently, not only to test the dialog itself and the controls on it, but also to open up other applications and test them. When this dialog changes, it can break many portions of GUI automation. As stated above, the GUI automation tools will identify buttons on the dialog, such as the Open button, by their properties (e.g., the text) or by finding the first item with the class "Button" on the dialog, or both, or even, as is the case with RFT, some combination of these attributes and others attaining some recognition threshold. However, if the text or position of the button changes (e.g., changing the text of the button to "OK" and moving the position to the bottom of the dialog), the GUI automation will likely break, even in the case of RFT because the threshold of difference will likely be met. When this happens, all GUI automation tools have an ability to open the tool and point a "recorder" at the application to record the new properties of the button, thus fixing the automation for the next and future runs. Unfortunately, because this happens frequently, this is a tedious and common manual task performed by the GUI tester.

The illustrative embodiments automates this manual task by using these corrections as training data to train a machine learning model to understand that an Open button is likely the same button as the OK button under certain conditions (e.g., the Open button no longer exists on the dialog). In this way, when a tester corrects the automation using the recorder, that correction can be used as training data to train the system to be self-correcting. This data could come not only from a single tester, but from all testers testing a particular application, or even from all testers using the GUI automation tool, by combining all the corrections into a single training set and retraining the application to better recognize changes in the GUI. Of course, this is just a single example; many more features than just text or class and order could be taken into account by taking not only all the properties of the current state of the system but also the previous state of the system. That is, it will take into account not only the present properties of the GUI control, but the previous properties it changed from. The illustrative embodiments train the machine learning model to recognize when an object has changed and what the object changed to.

This trained machine learning model can then be applied to the GUI automation for the next time the GUI changes. For example, if another button on some other dialog in the application changes from Open to OK, the system can recognize that automatically, change the properties of the object automatically, and click on the OK button from then on. In this way, the illustrative embodiments create a self-correcting GUI automation tool.

A couple more examples should help to further illustrate the breadth of the illustrative embodiments:

1) One common task for GUI automation testing is trying to get the same automation on one browser or operating system to work on other browsers or operating systems. The same problem with object recognition often crops up in these cases because different operating systems or browsers often have slightly different ways of presenting GUI objects. For instance, when moving automation from Windows™ operating system to the Linux™ operating system, the OK and Cancel buttons on standard dialogs are reversed. The mechanisms of the illustrative embodiments can be applied to this problem as well, thereby greatly expanding the range of GUI automation to other operating systems and Web browsers.

2) A more complex example, but one which is especially insidious and commonly encountered by GUI automation testers is the problem of "hidden tables." Many Web applications have hidden tables to control the positioning of GUI objects on the screen. A common example is check boxes, which may have no text associated with them directly, but only consist of a number of checkboxes in one column and then the associated text of the checkbox contained along the row with the checkbox. One way to deal with this problem is to simply count the checkboxes and click on the $n^{th}$ one; however, that is very fragile since if a developer adds another checkbox, all the automation that uses the order will have to be updated. A better way to deal with this problem is to programmatically find the text and then go back along the row to find the associated checkbox in another column. However, this also is fragile because the hierarchy of the tables often changes with updates to the structure of the GUI, and even more frustratingly, it will often change even when the checkboxes themselves are not changed. Thus, for example, additional hidden embedded tables can be added to each of the rows as developers add additional GUI elements to the dialog. Current GUI automation tools will produce false failures due to this problem, but the illustrative embodiments can avoid this problem. By using each correction as a training instance, the system can learn what changes in a table can be ignored and line up the correct rows and columns of the new table structure to match the text with the appropriate checkbox. Thus, the GUI automation continues to work even through changes to the embedded hidden table hierarchy.

In accordance with an illustrative embodiment, a GUI automation tool can take advantage of the following types of training data, supplied either by GUI testers of the application under test or by GUI testers of other applications bundled together with the product, as they correct automation in the normal course of their jobs. This training data can then be used to provide self-correcting GUI automation, automation trained to automatically take into account potential changes to the underlying GUI code to continue working through those changes, making for much less fragile automation code. It is important to note that this data may also include tags to determine whether a particular change is something that is safe to ignore or should be brought to the attention of a tester, thereby allowing testers to be informed of changes that the automation makes to ensure against false positives.

Figure 4:
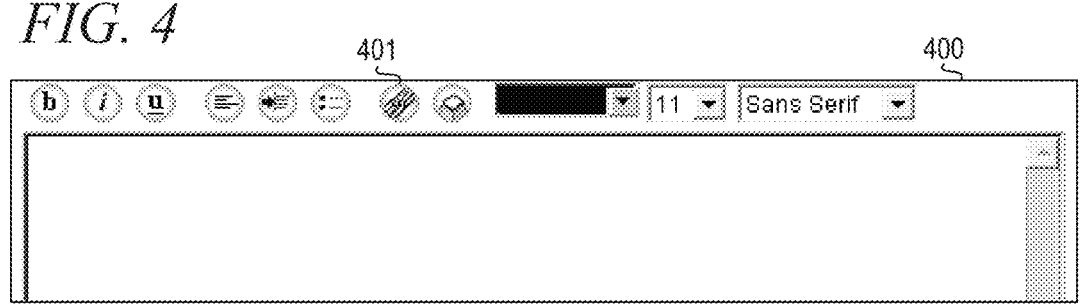
FIG. 4 depicts an example application graphical user interface in which aspects of the illustrative embodiments can be implemented.

The mechanisms of the illustrative embodiment may take into account the following: associated Text, parent GUI object and ancestor hierarchy in general, class and number and order of other objects with same class on parent, position on screen by pixels, and hidden tables including text on the same row that may have to be determined by the machine learning itself by navigating through many embedded tables in different cells to get the alignment. There are many more properties that can be taken into account by the training. FIG. 4 depicts an example application graphical user interface in which aspects of the illustrative embodiments can be implemented. In this example, one button 401 of GUI 400 may have many properties. FIG. 5 depicts a listing of properties for one button of a graphical user interface in accordance with an illustrative embodiment. The properties 500 for locating an object, such as button 401 of GUI 400 in FIG. 4, are available for the GUI control in question. The GUI automation tool of the illustrative embodiments may consider the properties of all the parent, children, and sibling objects as well.

Combining this training data as input features for machine learning allows for a much more finely tuned solution, allowing for much more subtle distinctions surrounding what is safe to ignore and what is not. By combining particular property changes and measuring them with a numerical value, the illustrative embodiments can produce a machine learning model to determine whether the change is enough to trigger an automation failure or whether the change can be safely ignored. Machine learning combines particular features, such as the text properties, hidden table changes, and order changes, puts a numeric measurement on the changes of those properties, and uses those measurements in combination to determine when a particular combination is large enough to merit a test failure. The GUI automation tool of the illustrative embodiments may continue to work through a change that does not reach that threshold.

Furthermore, other useful features can be gleaned from information external to the application itself, such as code changes from a source control system to determine whether or not the code changed and even whether the button itself we are trying to locate changed or whether it was another button, how many changes per day, number of defects, and what version the product is in (e.g., if it is the first version, the GUI is likely to be much less stable than later versions). All of these could be taken into account as training data as well; this could be used to fine tune and supplement the properties we get from the GUI Application itself.

Figure 6:
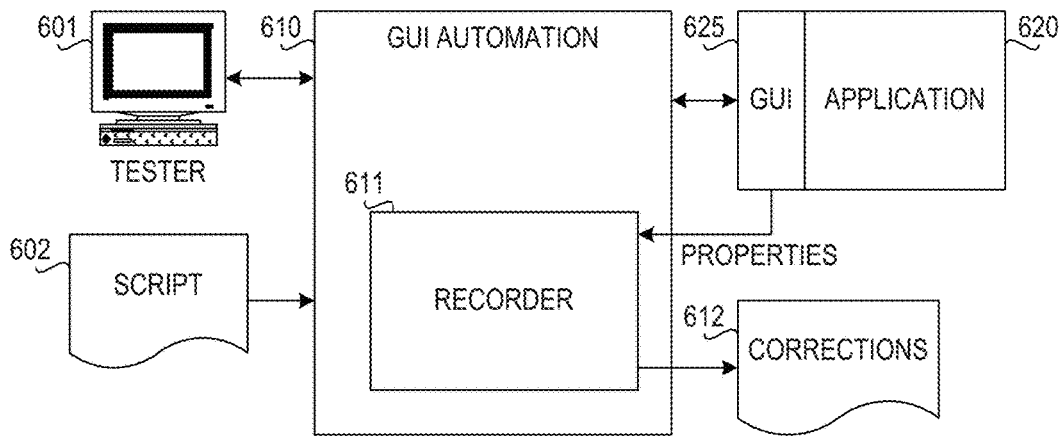
FIG. 6 is a block diagram of a mechanism for recording corrections to be used as a training set for automatically correcting GUI automation using machine learning in accordance with an illustrative embodiment.

FIG. 6 is a block diagram of a mechanism for recording corrections to be used as a training set for automatically correcting GUI automation using machine learning in accordance with an illustrative embodiment. A tester 601 uses graphical user interface (GUI) automation tool 610 to automate the GUI 625 for testing of application 620. Tester 601 executes script 602 to perform GUI automation functions, such as selecting buttons, checking checkboxes, entering text into text boxes, and the like in GUI 625.

When a GUI object in the script 602 cannot be identified in GUI 625, then a failure occurs. In this case, tester 601 can manually identify the GUI object and use recorder 611 to record a correction in corrections data structure 612. Each correction in corrections data structure 612 may include the previous properties of the GUI object in script 602 and the new properties of the identified object in GUI 625. Thus, corrections data structure 612 is a record of changes made to GUI objects as specified by the previous properties from the script 602 and the current properties of the GUI 625.

Figure 7:
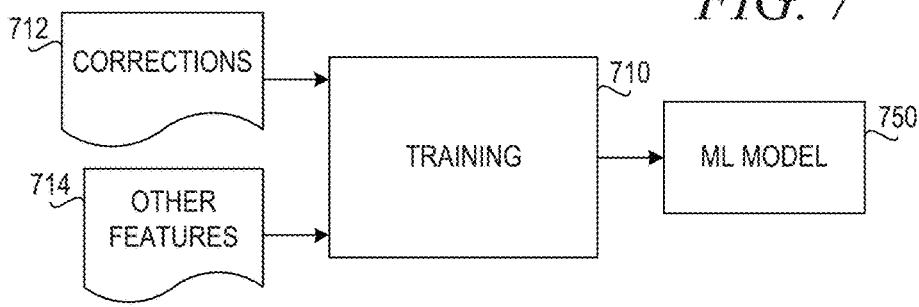
FIG. 7 is a block diagram of a mechanism for training a machine learning model for automatically correcting GUI automation in accordance with an illustrative embodiment.

FIG. 7 is a block diagram of a mechanism for training a machine learning model for automatically correcting GUI automation in accordance with an illustrative embodiment. Training tool 710 receives corrections 712 and other features 714. As described above corrections 712 may include changes made to GUI objects. Other features 714 may include, for example, code changes from a source control system, how many changes per day, number of defects, the version of the application, etc. Training tool 710 uses corrections 712 and other features 714 as training data to train machine learning model 750.

Machine learning model 750 may use supervised or unsupervised techniques, including regression or clustering. In a supervised model, corrections 712 may include actual corrections, which are labeled as "true," and GUI objects that are not known to be the same, which are labeled as "false." Training tool 710 may then use a classification model to train ML model 750. As another example, in an unsupervised model, training tool 750 may use clustering to divide GUI objects into clusters of similar objects and may train ML model 750 to find GUI objects that are similar to GUI objects in corrections 712.

Figure 8:
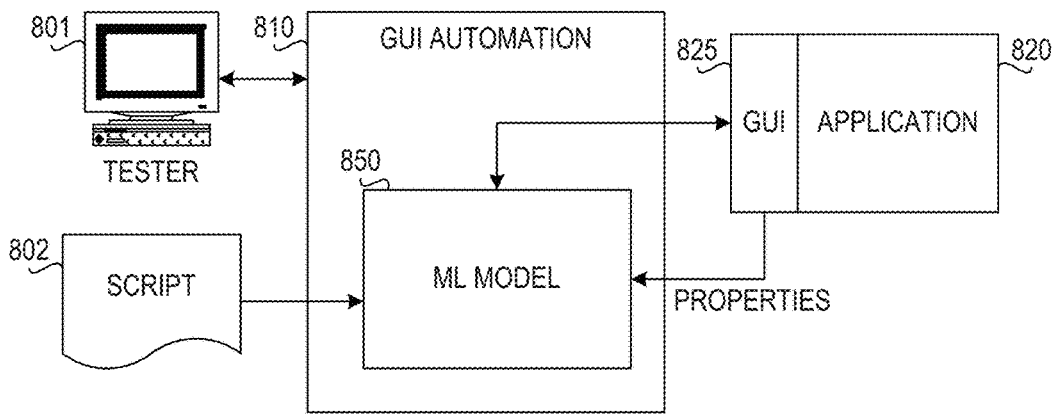
FIG. 8 is a block diagram of a mechanism for automatically correcting GUI automation using machine learning in accordance with an illustrative embodiment.

FIG. 8 is a block diagram of a mechanism for automatically correcting GUI automation using machine learning in accordance with an illustrative embodiment. Tester 801 executes script 802 to perform GUI automation functions, such as selecting buttons, checking checkboxes, entering text into text boxes, and the like in GUI 825 for testing of application 820. When a GUI object in the script 802 cannot be identified in GUI 825, then a failure occurs. In this case, machine learning (ML) model 850 identifies a GUI control in GUI 825 that is candidate for the GUI control in script 802 and determines a confidence value for the candidate GUI object.

GUI automation tool 810 may then compare the confidence value for the candidate GUI control object to a threshold. If the confidence value is greater than the threshold, then the GUI automation tool 810 automatically performs the GUI automation function on the identified GUI object, correcting the GUI control in script 802. If the confidence value is not greater than the threshold, then GUI automation tool 810 prompts tester 801 to select the identified GUI object or another GUI object in GUI 825. The GUI automation tool 810 then corrects the GUI object in script 802 and performs the GUI automation function using the selected GUI object.

In one embodiment, GUI automation tool 810 may also record the correction in a corrections data structure as described above with reference to FIG. 6. This correction can then be fed back into ML model 850 or used later for further training of ML model 850.

Figure 9:
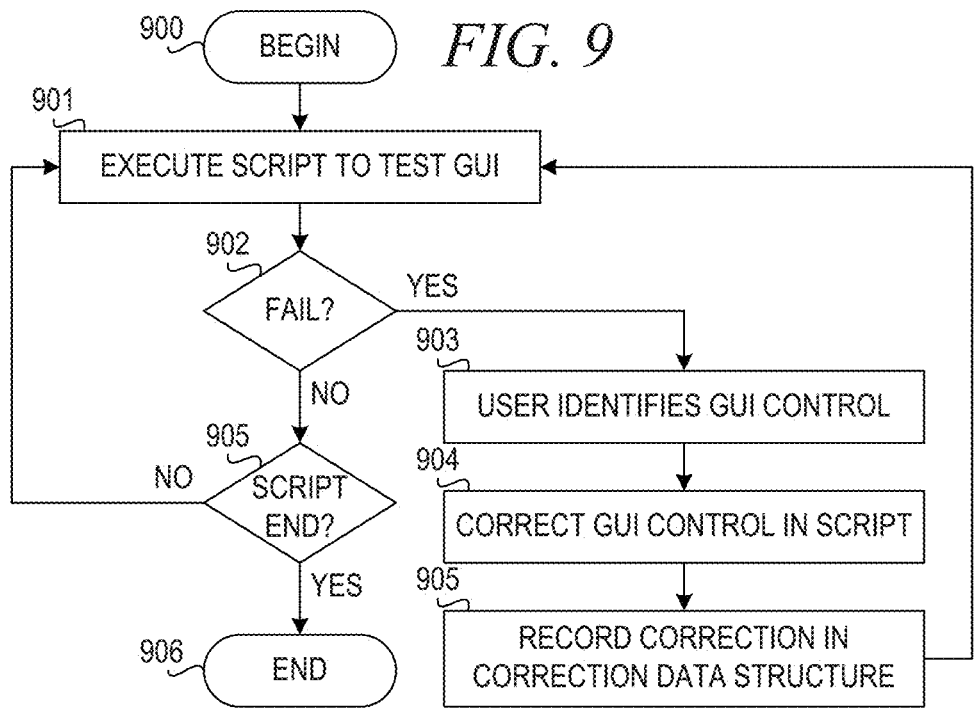
FIG. 9 is a flowchart illustrating operation of a mechanism for recording corrections to be used as a training set for automatically correcting GUI automation using machine learning in accordance with an illustrative embodiment.

FIG. 9 is a flowchart illustrating operation of a mechanism for recording corrections to be used as a training set for automatically correcting GUI automation using machine learning in accordance with an illustrative embodiment. Operation begins (block 900), and the mechanism executes a script to automate the GUI for testing of an application (block 901). The script may perform GUI automation functions, such as selecting buttons, checking checkboxes, entering text into text boxes, and the like in the GUI. The mechanism then determines whether GUI automation fails (bock 902). Automation may fail if an expected GUI object is not found in the GUI.

If GUI automation fails, a user identifies a GUI control in the GUI that is the same as the expected GUI control in the script (block 903). The mechanism corrects the GUI control in the script (block 904) and records the correction in a correction data structure (block 905). Then, operation returns to block 901 to continue execution of the script.

If GUI automation does not fail in block 902, then the mechanism determines whether the script ends execution (block 905). If the script does not end execution, then operation returns to block 901 to continue execution of the script. If the script ends in block 905, then operation ends (block 906).

Figure 10:
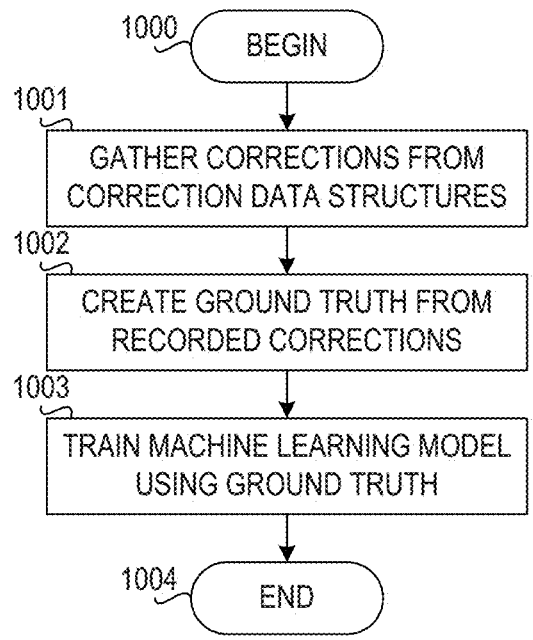
FIG. 10 is a flowchart illustrating operation of a mechanism for training a machine learning model for automatically correcting GUI automation in accordance with an illustrative embodiment.

FIG. 10 is a flowchart illustrating operation of a mechanism for training a machine learning model for automatically correcting GUI automation in accordance with an illustrative embodiment. Operation begins (block 1000), and the mechanism gathers corrections from one or more correction data structures (block 1001). The mechanism may consider corrections from testing a single application or may consider corrections across applications. The mechanism creates ground truth from the recorded corrections (block 1002). The mechanism trains a machine learning model using the ground truth (block 1003). Thereafter, operation ends (block 1004).

FIG. 11 is a flowchart illustrating operation of a mechanism for automatically correcting GUI automation using machine learning in accordance with an illustrative embodiment. Operation begins (block 1100), and the mechanism executes a script to automate the GUI for testing of an application (block 1101). The script may perform GUI automation functions, such as selecting buttons, checking checkboxes, entering text into text boxes, and the like in the GUI. The mechanism then determines whether GUI automation fails (bock 1102). Automation may fail if an expected GUI object is not found in the GUI.

If GUI automation fails, the mechanism uses a machine learning model to identify a GUI control in the GUI and determines a confidence value representing a likelihood that the identified GUI control is the same as the expected GUI control (block 1103). The mechanism compares the confidence value to a threshold (block 1104). The mechanism determines whether the confidence value is greater than the threshold (block 1105). If the confidence value is greater than the threshold, then the mechanism automatically corrects the GUI control in the script (block 1106). Operation returns to block 1101 to continue execution of the script.

The mechanism prompts a user to select the identified GUI control or to identify a GUI control in the GUI that is the same as the expected GUI control (block 1107). The mechanism records a correction of the GUI control in a correction data structure (block 1108) and corrects the GUI control in the script (block 1108). Then, the mechanism corrects the GUI control in the script (block 1106), and operation returns to block 1101 to continue execution of the script.

If GUI automation does not fail in block 1102, then the mechanism determines whether the script ends execution (block 1109). If the script does not end execution, then operation returns to block 1101 to continue execution of the script. If the script ends in block 1109, then operation ends (block 1110).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to implement a user interface automation tool, the method comprising:

executing, by the user interface automation tool, a script to perform automation functions on user interface controls in a user interface of an application;

responsive to automation of a given user interface control failing, identifying, by the user interface automation tool, a candidate user interface control that is the same as a user interface control expected in the script using a machine learning model, wherein the machine learning model receives as input object properties of the given user interface control in the script, object properties of user interface objects in the user interface, code changes from a source control system, how many changes per day, number of defects, and a version of the application;

correcting, by the user interface automation tool, the script to refer to the candidate user interface control to form a corrected script; and performing, by the user interface automation tool, a user interface function on the candidate user interface control according the corrected script.

2. The method of claim 1, further comprising:

monitoring corrections to one or more user interface automation scripts;

recording the corrections to the one or more user interface automation scripts in a corrections data structure; and training the machine learning model using the recorded corrections in the corrections data structure as training data.

3. The method of claim 2, wherein the corrections data structure comprises for each of correction a previous set of properties for a changed user interface control and a current set of properties for the changed user interface control.

4. The method of claim 1, wherein correcting the script comprises prompting a user to approve the candidate user interface object.

5. The method of claim 4, wherein correcting the script further comprises correcting the script and recording the correction in a correction data structure in response to the user approving the candidate user interface object.

6. The method of claim 1, wherein correcting the script comprises correcting object properties of the given user interface control.

7. The method of claim 1, wherein correcting the script comprises correcting hidden tables associated with the given user interface control.

8. A computer program product comprising a non-transitory computer readable storage medium having a computer readable program stored therein, wherein the computer readable program, when executed on a computing device, causes the computing device to implement a user interface automation tool, wherein the computer readable program causes the computing device to:

execute, by the user interface automation tool, a script to perform automation functions on user interface controls in a user interface of an application;

responsive to automation of a given user interface control failing, identify, by the user interface automation tool, a candidate user interface control that is the same as a user interface control expected In the script using a machine learning model, wherein, the machine learning model receives as input object properties of the given user interface control in the script, object properties of user interface objects in the user interface, code changes from a source control system, how many changes per day, number of defects, and a version of the application;

correct, by the user interface automation tool, the script to refer to the candidate user interface control to form a corrected script; and perform, by the user interface automation tool, a user interface function on the candidate user interface control according the corrected script.

9. The computer program product of claim 8, wherein the computer readable program further causes the computing device to:

monitor corrections to one or more user interface automation scripts;

record the corrections to the one or more user interface automation scripts in a corrections data structure; and train the machine learning model using the recorded corrections in the corrections data structure as training data.

10. The computer program product of claim 9, wherein the corrections data structure comprises for each of correction a previous set of properties for a changed user interface control and a current set of properties for the changed user interface control.

11. The computer program product of claim 8, wherein correcting the script comprises prompting a user to approve the candidate user interface object.

12. The computer program product of claim 11, wherein correcting the script further comprises correcting the script and recording the correction in a correction data structure in response to the user approving the candidate user interface object.

13. The computer program product of claim 8, wherein correcting the script comprises correcting object properties of the given user interface control.

14. The computer program product of claim 8, wherein correcting the script comprises correcting hidden tables associated with the given user interface control.

15. An apparatus comprising:

a processor; and a memory coupled to the processor, wherein the memory comprises instructions which, when executed by the processor, cause the processor to implement a user interface automation tool, wherein the instructions cause the processor to:

execute, by the user interface automation tool, a script to perform automation functions on user interface controls in a user interface of an application;

responsive to automation of a given user interface control failing, identify, by the user interface automation tool, a candidate user interface control that is the same as a user interface control expected in the script using a machine learning model, wherein the machine learning model receives as input object properties of the given user interface control in the script, object properties of user interface objects in the user interface, code changes from a source control system, how many changes per day, number of defects, and a version of the application;

correct, by the user interface automation tool, the script to refer to the candidate user interface control to form a corrected script; and perform, by the user interface automation tool, a user interface function on the candidate user interface control according the corrected script.

16. The apparatus of claim 15, wherein the instructions further cause the processor to:

monitor corrections to one or more user interface automation scripts;

record the corrections to the one or more user interface automation scripts in a corrections data structure; and train the machine learning model using the recorded corrections in the corrections data structure as training data.

17. The apparatus of claim 16, wherein the corrections data structure comprises for each of correction a previous set of properties for a changed user interface control and a current set of properties for the changed user interface control.

18. The apparatus of claim 15, wherein correcting the script comprises prompting a user to approve the candidate user interface object.

19. The apparatus of claim 18, wherein correcting the script further comprises correcting the script and recording the correction in a correction data structure in response to the user approving the candidate user interface object.

20. The apparatus of claim 15, wherein correcting the script comprises correcting hidden tables associated with the given user interface control.

* * * * *